(12) United States Patent
Gibson

(10) Patent No.: US 6,679,296 B2
(45) Date of Patent: Jan. 20, 2004

(54) DUCTING

(75) Inventor: Diane Gibson, Clydebank (GB)

(73) Assignee: Smiths Group PLC, London (GB)

( * ) Notice: Subject to any disclaimer, the term of this patent is extended or adjusted under 35 U.S.C. 154(b) by 0 days.

(21) Appl. No.: 10/385,477

(22) Filed: Mar. 12, 2003

(65) Prior Publication Data

US 2003/0172981 A1 Sep. 18, 2003

(30) Foreign Application Priority Data

Mar. 15, 2002 (GB) .............................................. 0206074

(51) Int. Cl.⁷ ................................................. F16L 11/00
(52) U.S. Cl. ........................ 138/131; 138/143; 138/144; 138/129
(58) Field of Search ................................ 138/131, 129, 138/137, 141, 140, 144, 150, 154, 143; 181/207

(56) References Cited

U.S. PATENT DOCUMENTS

| | | | | |
|---|---|---|---|---|
| 1,810,032 A | * | 6/1931 | Schulthess ................... | 138/131 |
| 2,936,792 A | * | 5/1960 | MacCracken et al. ....... | 138/131 |
| 3,016,503 A | * | 1/1962 | Pierce ......................... | 333/242 |
| 3,216,459 A | * | 11/1965 | Schroeder et al. ........... | 138/139 |
| 3,323,553 A | * | 6/1967 | Richitelli et al. ............ | 138/122 |
| 3,616,123 A | * | 10/1971 | Reynolds et al. ............ | 428/222 |
| 4,417,603 A | * | 11/1983 | Argy ........................... | 138/149 |
| 4,423,283 A | * | 12/1983 | Weismann .................... | 174/47 |
| 4,452,280 A | * | 6/1984 | Werner ........................ | 138/131 |
| 4,489,759 A | * | 12/1984 | Yamamura ................... | 138/122 |
| 4,690,175 A | * | 9/1987 | Ouchi et al. ................. | 138/131 |
| 4,899,787 A | * | 2/1990 | Ouchi et al. ................. | 138/131 |
| 6,152,186 A | | 11/2000 | Arney et al. ................. | 138/129 |
| 6,186,181 B1 | * | 2/2001 | Schippl ....................... | 138/112 |
| 6,240,964 B1 | * | 6/2001 | Cooper et al. ............... | 138/30 |
| 6,347,646 B2 | * | 2/2002 | Fukui et al. ................. | 138/129 |

FOREIGN PATENT DOCUMENTS

| EP | 0342802 A3 | 11/1989 |
|---|---|---|
| EP | 0342802 A2 | 11/1989 |
| GB | 1574480 | 9/1980 |

OTHER PUBLICATIONS

GB 2218772 A Harry Forbes et al. Nov. 22, 1989.*

* cited by examiner

*Primary Examiner*—Patrick Brinson
(74) *Attorney, Agent, or Firm*—Connolly Bove Lodge & Hutz LLP

(57) ABSTRACT

Sound attenuating ducting has an inner, helical wire supporting an inner and outer layer formed by strips of a foamed thermoplastic rubber material. Axial and helical reinforcing yarns extend along the ducting between the layers. The two strips are applied from extruders, the extrusion rate of the inner strip being set to be less than that of the outer strip so that the inner strip is stretched to produce a more porous structure than in the outer strip. In this way, the inner layer is efficient in absorbing orifice noise within the ducting and the outer layer contains radiated noise.

17 Claims, 1 Drawing Sheet

DUCTING

BACKGROUND OF THE INVENTION

This invention relates to ducting.

The invention is more particularly concerned with ducting having sound absorbing properties.

Ducting with sound absorbing properties is often used in applications where it extends from a high noise environment, so as to prevent transmission of this noise. To achieve the greatest sound absorbing properties, the ducting should have a high attenuation of orifice noise, that is, noise transmitted along the length of the ducting through its bore, and a high attenuation of radiated noise, that is, noise transmitted through the wall of the ducting. It is difficult to provide low cost, lightweight ducting having a high attenuation of both orifice and radiated noise. In some cases, the ducting may require greater orifice attenuation and lower radiated attenuation, whereas in other cases the ducting may require greater radiated attenuation and lower orifice attenuation. The need to make specialised ducting for these different applications adds to the cost of manufacture. Ducting can be provided with an inner layer of a sound absorbing foam, such as described in GB2218772. In this previous ducting, overlapping parts of a helical foam strip are crimped into a helical metal channel and this is covered by an outer impervious sleeve shrunk about the channel.

BRIEF SUMMARY OF THE INVENTION

It is an object of the present invention to provide improved ducting.

According to the present invention there is provided ducting comprising an inner support member of helical shape, a first layer wound helically about the outside of the support member and bonded thereto, and a second layer wound helically about the outside of the first layer, the first and second layers being both of a permeable, open cell thermoplastic rubber material.

The first layer preferably has a substantially higher permeability than the second layer. The first layer may have a multiplicity of holes between 2 mm and 3 mm in width, the second layer having fewer, smaller holes less than about 1 mm in width. The first and second layers are preferably of substantially the same chemical composition. The first and second layers are preferably produced by extrusion and the extrusion output of the first layer is preferably lower than that of the second layer. The first layer may be wound onto the inner support member while warm so that it bonds with the support member. The first layer may be provided by a strip wrapped on the inner support member with the same pitch and overlapping approximately half the width of adjacent turns. The inner support member may be a plastic-coated wire. The ducting may include a plurality of yarns of non-elastic material extending axially along the ducting between the two layers. The ducting may include a yarn of non-elastic material extending helically around the ducting between the two layers, which is preferably wound on top of the axially-extending yarns.

Sound attenuating ducting according to the present invention will now be described, by way of example, with reference to the accompanying drawing.

DETAILED DESCRIPTION OF THE PREFERRED EMBODIMENT

Figure 1:
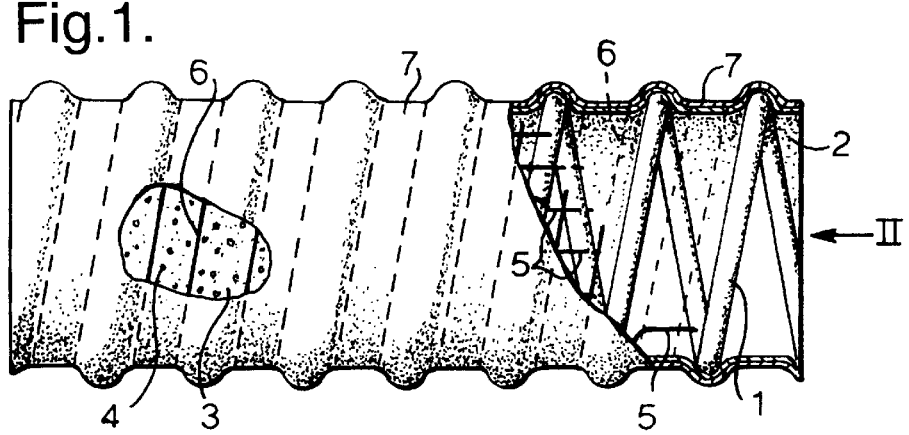
FIG. 1 is a partly cut-away side elevation view of the ducting.
Figure 2:
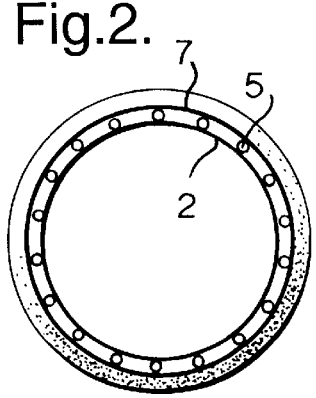
FIG. 2 is an end view of the ducting along the arrow II of FIG. 1.
Figure 4:
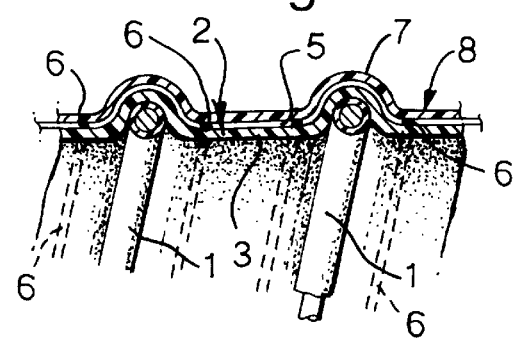
FIG. 4 is an enlarged cross-sectional side elevation view of a part of the ducting.
Figure 3:
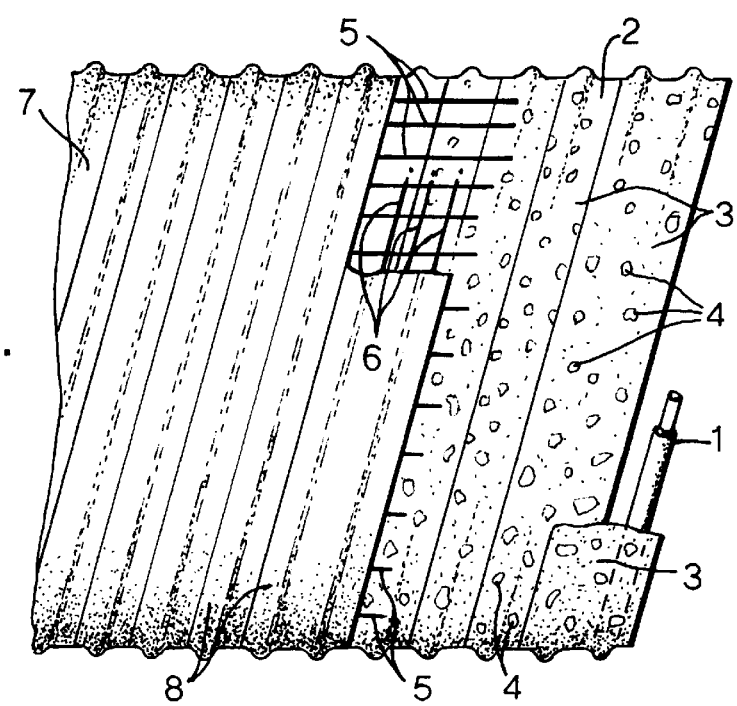
FIG. 3 is an enlarged side elevation view showing parts of the two layers stripped back.

The ducting comprises an inner support member in the form of a plastic-coated steel wire 1 wound into a helical configuration. The wire 1 is stiff enough to provide the main structural support of the ducting whilst enabling the ducting to be flexed and to be compressed axially. Typically, the wire 1 has a diameter of 1 mm and is wound into a helix having a diameter of about 80 mm and a pitch of about 11 mm. It will be appreciated that the ducting could have a range of different diameters, typically from about 60 mm to 80 mm, and that the diameter and pitch of the wire can also be varied The wire 1 supports a covering including an inner layer 2 of a chemically foamed EPDM/PP based thermoplastic rubber. The layer 2 is formed by a strip 3 about 24 mm wide, which is wrapped helically with the same pitch as the wire 1 so that it overlaps about half the width of adjacent turns. The strip 3 is extruded and is wrapped on the wire 1 while it is still warm, so that it bonds with the wire and with adjacent turns of the strip. Alternatively, the strip 3 could be extruded and stored in roll form before being wrapped on the wire at a later stage. In this case, an adhesive or solvent would be needed to bond the strip to the wire. The inner strip 3 is extruded at a relatively low output so that the foamed melt is stretched as it is wound on the wire 1. This gives the material an open cell structure, where the cell pockets are highly fractured, so that the layer 2 has a multiplicity of holes 4 of width up to 2–3 mm. This makes the inner layer 2 highly porous.

The ducting has eighteen thin yarns 5 of nylon, or a similar high strength, non-elastic material, extending axially a long the duct on top of the inner layer 2 and equally spaced around the duct. The purpose of these yarns 5 is to act a s an axial reinforcement, that is, to prevent axial extension of the ducting; different amounts of yarns could be used. The ducting also has a two further yarns 6 of the same material, which are wrapped helically around the duct, on top of the inner layer 2 and crossing the axial reinforcement yarns 5, between the turns of the wire 1. The purpose of these further yarns 6 is to provide a helical reinforcement, that is, to help prevent twisting of the duct and to pull down the axial yarns 5 into the valleys between the turns of the wire 1.

The final component of the ducting is a second, outer layer 7, which is of the same chemically foamed thermoplastic rubber material as the inner layer 2. The outer layer 7 is provided by a strip 8 of the same width as the inner strip 3 and wound in the same manner as the strip 3 of the inner layer. The strip 8 is extruded at the same temperature as the inner strip 3 but at a higher output, so that the foamed melt is not stretched as much as the inner strip when it is wound onto the ducting. The outer layer 7 still has an open cell structure but the higher output means that the cell pockets are unfractured so that the layer has only a low porosity, with few holes and these being less than 1 mm in width. The outer strip 8 is wound helically parallel to the inner strip 3 on top of the reinforcing yarns 5 and 6. The outer strip 8 is extruded directly onto the inner strip 3 so that it bonds with it and traps the yarns 5 and 6 in position.

The ducting can be made simply on conventional machines.

The very porous nature of the inner layer 2 enables it to absorb orifice noise highly efficiently, whereas the less porous nature of the outer layer 7 also absorbs the orifice noise, but less efficiently, and is sufficiently non-porous to contain the radiated noise and to a greater extent than the inner layer. The combination, therefore, of the two porous layers 2 and 7 ensures that the wall of the duct absorbs a high amount of noise, giving it a high attenuation of both orifice noise and radiated noise. Although both layers 2 and 7 are porous, the ducting is generally used in low pressure, high volume applications so there is very little escape of gas through the wall of the duct. The construction of the ducting enables it to retain sufficient flexibility, to be light in weight and to have a low cost of manufacture. The inner and outer layers are compatible and can be bonded together easily because they have the same chemical composition.

Although the maximum noise attenuation is achieved by the combination of the inner and outer layers of different porosity, in some applications, it may be preferable for the duct to have a high orifice noise attenuation but a lower radiated noise attenuation is acceptable. In these circumstances, the duct could be made with both the inner and outer layers having the same, high porosity. On the other hand, if the application requires a high attenuation of radiated noise but a lower attenuation of orifice noise is acceptable, the duct could be made with both the inner and outer layers having the same, low porosity. The ducting can, therefore, easily be tailored to individual requirements simply by the choice of materials, or extrusion rates of the materials, from which the inner and outer strips are made.

What I claim is:

1. Ducting comprising: an inner support member of helical shape; a first layer wound helically about the outside of said support member and bonded thereto; and a second layer wound helically about an outside of said first layer, wherein said first and second layers are both of a permeable, open cell thermoplastic rubber material.

2. Ducting according to claim 1, wherein said first layer has a substantially higher permeability than said second layer.

3. Ducting according to claim 2, wherein said first layer has a multiplicity of holes between 2 mm and 3 mm in width, and wherein said second layer has fewer, smaller holes less than about 1 mm in width.

4. Ducting according to claim 1, wherein said first and second layers are of substantially the same chemical composition.

5. Ducting according to claim 1, wherein said first and second layers are produced by extrusion.

6. Ducting according to claim 5, wherein an extrusion output of said first layer is lower than that of said second layer.

7. Ducting according to claim 5, wherein said first layer is wound onto said inner support member while warm so that said first layer bonds with said support member.

8. Ducting according to claim 1, wherein said first layer is provided by a strip wrapped on said inner support member with the same pitch and overlapping approximately half the width of adjacent turns.

9. Ducting according to claim 1, wherein said inner support member is a plastic-coated wire.

10. Ducting according to claim 1 including a plurality of yarns of non-elastic material extending axially along the ducting between said two layers.

11. Ducting according to claim 1 including a yarn of non-elastic material extending helically around said ducting between said two layers.

12. Ducting according to claim 10 including a yarn of non-elastic material wound helically around said ducting between said two layers on top of said axially-extending yarns.

13. Sound attenuating ducting comprising: an inner helical support wire; a first layer extending along the outside of said support member and attached thereto; and a second layer extending along the outside of said first layer, wherein said first and second layers are of the same chemical composition but said first layer is arranged to absorb orifice noise more efficiently than said outer layer and said outer layer is arranged to contain radiated noise to a greater extent than said inner layer.

14. Sound attenuating ducting according to claim 13, wherein said first layer is more permeable than said second layer.

15. Ducting comprising: a plastic-coated helical wire; a first strip of foamed thermoplastic rubber of relatively high permeability wound helically on said wire; reinforcing yarns extending along the outside of said first layer; and a second strip of foamed thermoplastic rubber of relatively low permeability wound helically on said first strip on top of said yarns.

16. Ducting comprising: a helical wire; a first strip of foamed thermoplastic rubber extruded and wound helically on said wire; and a second strip of foamed thermoplastic rubber extruded and wound helically on said first strip, wherein the extrusion rate of said first strip is relatively low compared with that of said second strip.

17. Ducting comprising: an inner plastic-coated helical wire; a first extruded strip of a foamed thermoplastic rubber wound helically about the outside of said wire and bonded thereto; a plurality of non-elastic yarns extending axially along the ducting outside the first strip; a non-elastic yarn wound helically around the ducting on top of said axial yarns; and a second extruded strip of a foamed thermoplastic rubber wound helically about an outside of said first strip and said yarns and bonded thereto, and wherein said first and second strips are of the same chemical composition but said first strip is more permeable than said second strip.

* * * * *